(12) United States Patent
Bertolini et al.

(10) Patent No.: US 11,933,361 B2
(45) Date of Patent: Mar. 19, 2024

(54) BEARING UNIT WITH A SEALING DEVICE

(71) Applicant: AKTIEBOLAGET SKF, Gothenburg (SE)

(72) Inventors: Andrea A. Bertolini, Carrara (IT); Fausto Baracca, Massa (IT); Fabio Falaschi, Carrara (IT)

(73) Assignee: AKTIEBOLAGET SKF (SE)

( * ) Notice: Subject to any disclaimer, the term of this patent is extended or adjusted under 35 U.S.C. 154(b) by 0 days.

(21) Appl. No.: 17/990,024

(22) Filed: Nov. 18, 2022

(65) Prior Publication Data

US 2023/0160433 A1 May 25, 2023

(30) Foreign Application Priority Data

Nov. 24, 2021 (IT) .......................... 102021000029606

(51) Int. Cl.
*F16C 23/08* (2006.01)
*F16C 19/06* (2006.01)
(Continued)

(52) U.S. Cl.
CPC .......... *F16C 33/7823* (2013.01); *F16C 19/06* (2013.01); *F16C 23/084* (2013.01);
(Continued)

(58) Field of Classification Search
CPC .... F16C 19/06; F16C 23/084; F16C 33/6607; F16C 33/6618; F16C 33/7823;
(Continued)

(56) References Cited

U.S. PATENT DOCUMENTS 3,807,819 A * 4/1974 Zimmer ................ F16C 19/385
384/558
5,704,719 A * 1/1998 Cook ...................... F16C 23/084
384/489
(Continued)

FOREIGN PATENT DOCUMENTS

| CN | 104912942 | 9/2015 |
| CN | 110 030 278 | 7/2019 |

(Continued)

OTHER PUBLICATIONS

Search Report for corresponding Italy Patent Application No. 102021000029606 dated Jun. 29, 2022.

*Primary Examiner* — Phillip A Johnson
(74) *Attorney, Agent, or Firm* — Reed Smith LLP

(57) ABSTRACT

A bearing unit having a stationary radially outer ring, a radially inner ring, rotatable with respect to a rotation axis (X) and steadily connected to a rotating shaft, a row of rolling bodies interposed between the radially outer ring and the radially inner ring, a casing, inside which the rings of the bearing unit are housed, a sealing device, and a protection disk. The protection disk may be mounted in an axially external position to the sealing device and fixed to the radially inner ring. Additionally, the protection disk may have a shaped metallic screen, and an elastomer coating over-molded on part of the screen. The protection disk may further be in contact with an axially external surface of the radially outer ring through the elastomer coating, which is provided with two lips, a first lip, non-contacting or contacting and radially external, and a second lip, contacting and radially internal.

12 Claims, 4 Drawing Sheets

(51) Int. Cl.
*F16C 33/78* (2006.01)
*F16C 33/80* (2006.01)

(52) U.S. Cl.
CPC ...... *F16C 33/7883* (2013.01); *F16C 33/7886* (2013.01); *F16C 33/7896* (2013.01); *F16C 33/80* (2013.01)

(58) Field of Classification Search
CPC .............. F16C 33/7853; F16C 33/7879; F16C 33/7883; F16C 33/7886; F16C 33/7889; F16C 33/7896; F16C 33/80; F16C 33/805
See application file for complete search history.

(56) References Cited

U.S. PATENT DOCUMENTS

| | | | | |
|---|---|---|---|---|
| 7,290,351 | B2 * | 11/2007 | Niarfeix | F16C 41/008 33/645 |
| 2002/0150317 | A1 * | 10/2002 | Vogelgesang | F16C 33/7853 384/495 |
| 2019/0162312 | A1 * | 5/2019 | Okaji | F16C 33/805 |

FOREIGN PATENT DOCUMENTS

| | | | | |
|---|---|---|---|---|
| DE | 4312364 A1 * | 10/1994 | | F16C 23/084 |
| EP | 2995829 | 3/2016 | | |
| EP | 3070355 | 9/2016 | | |

* cited by examiner

BEARING UNIT WITH A SEALING DEVICE

CROSS-REFERENCE OF RELATED APPLICATIONS

This application is based on and claims priority to Italian Patent Application No. 102021000029606 filed on Nov. 24, 2021, under 35 U.S.C. § 119, the disclosure of which is incorporated by reference herein.

BACKGROUND

The present disclosure relates to a bearing unit having a sealing device. Such a bearing unit may be suitable for use in manufacturing, and in particular in the agricultural sector, mining and for other heavy-duty applications featuring a dusty environment.

BRIEF DESCRIPTION OF THE DRAWINGS

The disclosure will now be described with reference to the appended drawings which show exemplary embodiments thereof, in which.

DETAILED DESCRIPTION

Figure 1:
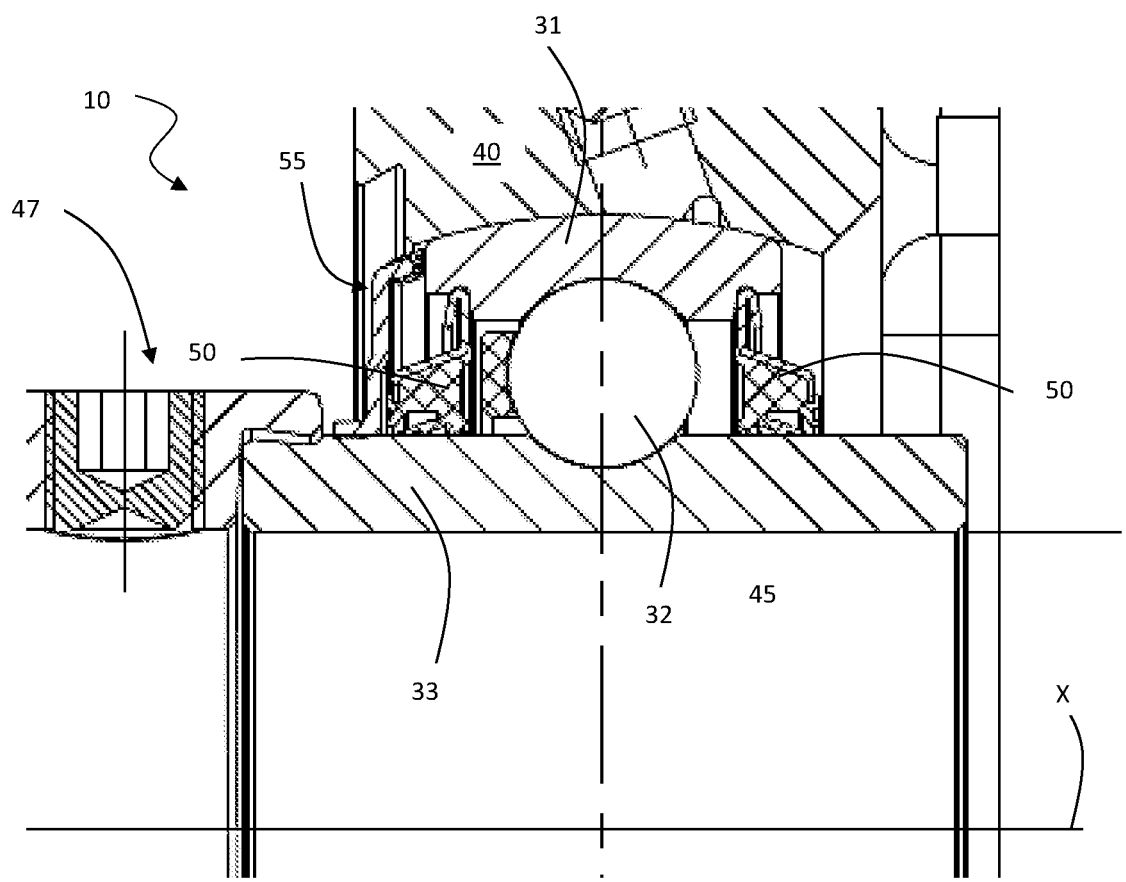
FIG. 1 is a cross sectional view of a bearing unit according to exemplary embodiments of the disclosure.

In general, the bearing unit may have a first component, for example a radially outer ring, which is secured to a stationary element, generally a containment casing, and a second component, for example a radially inner ring, which is secured to a rotary element, typically a rotating shaft. In other applications, it may be that the radially inner ring is stationary while the radially outer ring is rotary. In any case, in rolling bearing units, the rotation of one ring with respect to the other is made possible by a plurality of rolling bodies which are positioned between the two surfaces of the components, referred to as raceways. The rolling bodies may be balls, cylindrical or conical rollers, needle rollers and similar rolling bodies.

Bearing units may have sealing devices to protect the raceways and rolling bodies from external contaminants and to create a seal with respect to lubricant. The sealing devices may have an elastomer seal co-molded on a first shaped metal screen mounted by interference or chamfer in a seat of the rings of the bearing unit, for example of the radially outer ring. The seal may have at least one sealing lip, contacting or non-contacting, which performs its sealing function by frictional contact with the other ring of the bearing unit or by a labyrinth formed with the ring.

A second metal screen with the function of protecting the seal and in any case constituting a first barrier against external contaminants may be mounted in an axially external position with respect to the seal. This second metal screen may be shaped and mounted by interference on the radially inner ring, which may be rotatable, and may face, with play, a radially internal surface of the radially outer ring.

Unlike other applications, the bearing units used for agricultural applications often only have the seal and do not use the axially external second metal screen. This is because, in agricultural applications, plant fibers often get in between the second screen and the seal to the extent that the screen comes off the bearing unit, directly exposing the seals to the action of contaminants. The ingress of plant fibers into the space between the second screen and the seal can be prevented if the second screen is also housed in a seat of the radially outer ring in a position closer to the seal. However, this arrangement is not feasible since the production process and the axial play of the bearing cannot guarantee that there is always a minimum distance between the screen and the seal: in such a case, therefore, there is the risk of contact between the screen and the seal.

Therefore, for agricultural applications only the seals may be used, the performance of which is enhanced through the use of a greater number of sealing lips, for example five. However, as well as increasing the axial space requirement, this arrangement also leaves the seal directly exposed to contaminants.

In any case, regardless of whether use is made of a standard sealing device—seal and screen—or only the seal with a greater number of sealing lips, a further drawback is encountered in applications, for example in mining, in which performance is validated by passing a test specially developed for this type of application known as "Sand&Stone". During such a test it is often found that the seals are damaged by being hit by stone chippings, to the extent that they become deformed and are no longer able to perform their protective function.

Various embodiments of the present disclosure increase the protection for the bearing unit, i.e., providing the bearing unit with a protection disk, which is suitable in particular for agricultural applications but also for all other applications operating in dusty external environments, for example in the mining industry. This disk may include a screen and an elastomer coating having two lips, may be axially external with respect to the sealing device and may be in contact with an axially external surface of the radially outer ring through the elastomer coating.

With reference to FIG. 1, a bearing unit for use in the agricultural or mining sector may include a stationary radially outer ring 31, a radially inner ring 33, rotatable with respect to a central rotation axis X of the bearing unit 10, and rigidly secured to a rotating shaft 45 by an eccentric locking collar 47 or other securing means, for example socket screws, a row of rolling bodies 32, in this example balls, interposed between the radially outer ring 31 and the radially inner ring 33 to allow them to rotate relative to one another, and a casing 40, inside which the rings of the bearing unit 10 are housed.

Throughout the present description and the claims, terms and expressions indicating positions and orientations such as "radial" and "axial" are intended with reference to the rotation axis X of the bearing unit 10.

For simplicity, the reference sign 32 designates both individual rolling bodies and the row of rolling bodies. Again for simplicity, the term "ball" may be used by way of example in the present description and in the attached drawings instead of the more generic term "rolling body" (with the same numerical references also being used). Some embodiments and the related drawings may use rolling bodies other than balls, without this departing from the scope of the present disclosure.

The bearing unit 10 may also include a sealing device 50, which may include an elastomer seal co-molded on a shaped metal screen mounted by interference in a seat of the radially outer ring and having a plurality of sealing lips.

Figure 2:
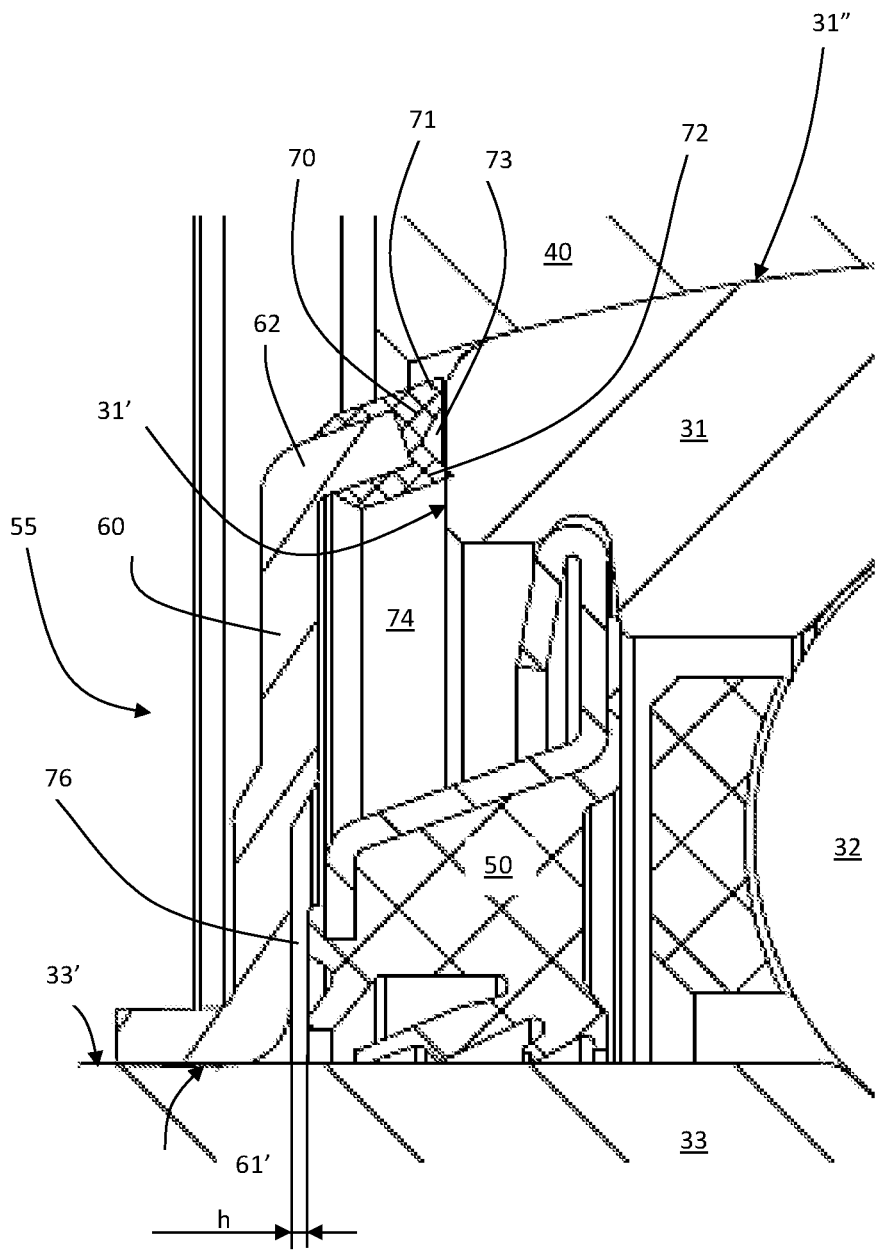
FIG. 2 is a detail view, on a larger scale, of the bearing unit of FIG. 1.
Figure 3:
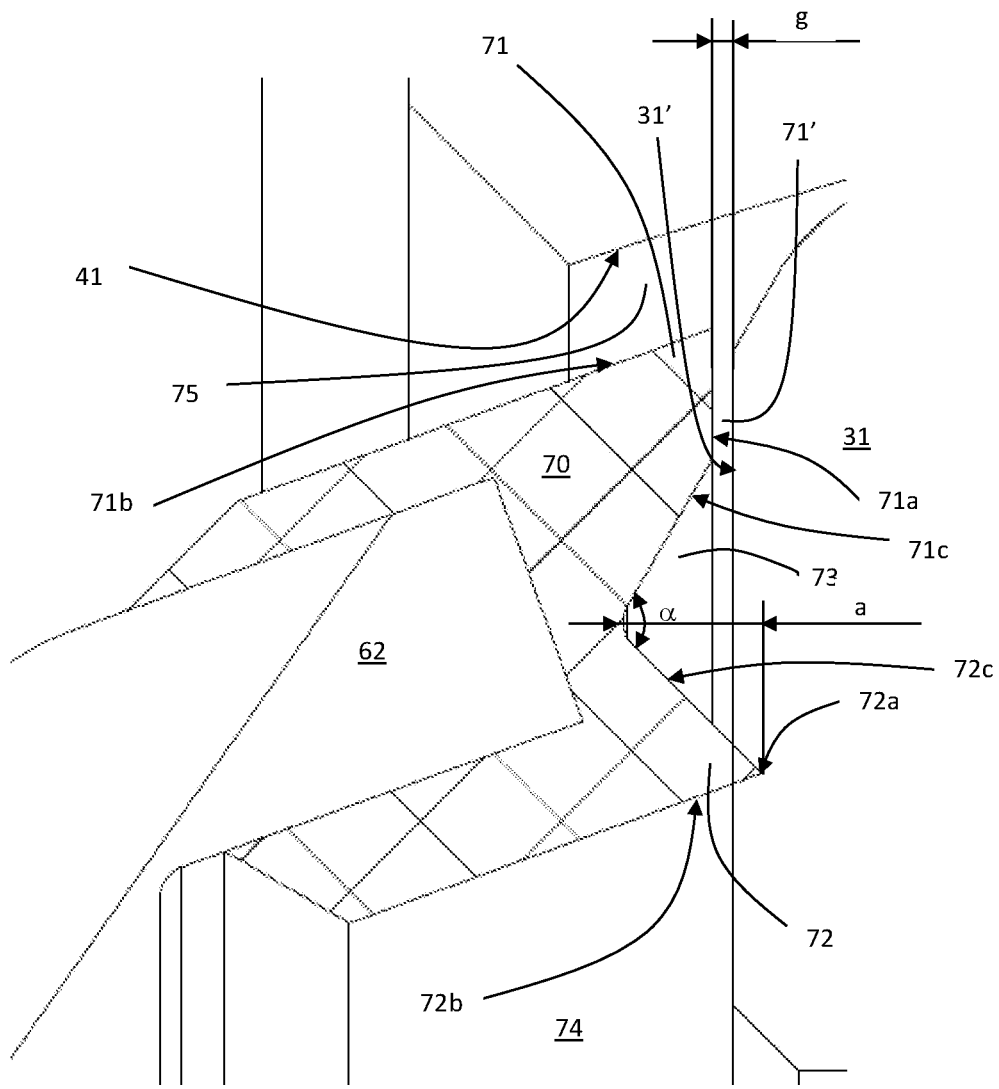
FIG. 3 is a detail view, on an even larger scale, of a detail of the bearing unit of FIG. 1.

According to the present disclosure and with reference also to FIGS. 2 and 3, the bearing unit 10 may have a protection disk 55, mounted in an axially external position to the sealing device 50, and may include a screen 60 shaped and made of metallic material, and an elastomer coating 70 over-molded on part of the screen 60. The screen 60 may be fixed to the radially inner ring 33 by coupling by interference between a radially internal cylindrical surface 61' of the screen 60 and a radially external cylindrical surface 33' of the radially inner ring 33. The disk 55 may provide additional protection against external contaminants while at the same time protecting the sealing device 50 or sealing devices of different configuration.

Figure 4:
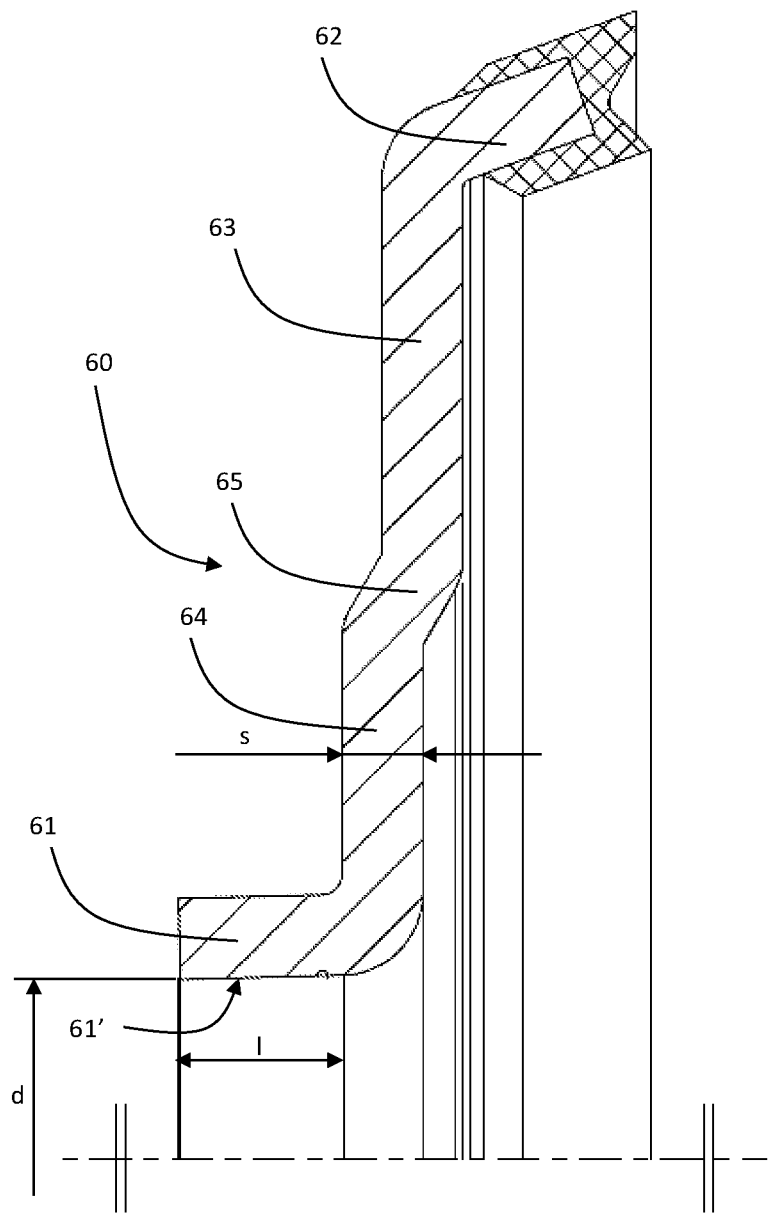
FIG. 4 is a cross-sectional view of a shaped screen of the bearing unit of FIG. 1.

With reference to FIG. 4, the screen 60 may include cylindrical portion 61, radially internal, which may include the surface 61' and, therefore, the coupling by interference with the radially inner ring 33, and a distal portion 62 oblique in a radially external and axially internal direction. Screen 60 may further include a first flange portion 63 steadily connected to the distal portion 62, a second flange portion 64, steadily connected to the cylindrical portion 61, and an oblique portion 65 for connection between the two flange portions 63, 64.

To prevent plant fibers from getting in between the disk 55 and the sealing device 50, the protection disk 55 may be in contact with an axially external surface 31' of the radially outer ring 31, and this contact takes place via the elastomer coating 70, which is over-molded, in particular, on the distal portion 62. The elastomer coating 70 may be provided with two lips, a first lip 71, non-contacting or contacting and radially external, and a second lip 72, contacting and radially internal.

The first lip 71 may be delimited axially by an annular surface 71a, which defines a channel 71' with the axially external surface 31' of the radially outer ring 31. This channel 71' forms a labyrinth seal, thereby increasing the protection of the bearing unit. The value of the axial width of the channel 71', in other words, the value of the meatus g between the first lip 71 and the surface 31', in nominal conditions may be equal to 0.06 mm. Considering the axial play of the components of the bearing unit, the positioning tolerances of the disk 55 with respect to the bearing unit 10, and the extent to which the second lip 72 deforms on mounting, as will be explained in more detail below, the first lip 71 may come into frictional contact with the surface 31' of the radially outer ring 31, or interference, albeit only slight, may be created between the first lip 71 and the surface 31'.

Alternatively, again considering the above, the first lip 71 may also possibly move away from the surface 31', thus increasing the value of the meatus g. The bearing unit provides that the meatus g, or the axial width of the channel 71', may not exceed, under extreme conditions of axial play between the components of the bearing unit, a value equal to 0.2 mm, in order to continue to ensure the labyrinth seal effect.

The lips 71 and 72 may also be delimited radially by a radially external conical surface 71b and, respectively, by a radially internal conical surface 72b which are parallel to one another and inclined with respect to the rotation axis X of the bearing unit by an angle with dimensions equal to the dimensions of an angle of inclination of the oblique distal portion 62. The inclination of the distal portion 62 and of the lips 71, 72, in a radially external and axially internal direction, is such as to encourage contaminants which hit against the disk 55 to return to the outside.

The protection disk 55 may be located in a radially internal position with respect to a radially internal spherical surface 41 of the casing 40. Since the disk 55 is covered by the casing, this further reduces the risk of plant fibers getting in between the disk 55 and the sealing device 50.

The second lip 72, radially internal with respect to the first lip 71, may be a lip contacting the surface 31' of the radially outer ring. The lip 72 is delimited axially by an annular edge 72a which extends axially beyond the annular surface 71a of the lip 71 so as to come into contact with the surface 31' preventing contact of the lip 71. The lip 72 is shown in a non-deformed configuration in which, in use, the annular edge 72a tends to be compressed axially. In other words, the annular edge 72a collapses on itself, allowing the annular surface 71a of the upper first lip 71 to move closer, this surface 71a always being perpendicular to the rotation axis X of the bearing unit 10. The value of the meatus g of the channel 71' also depends on the extent to which the second lip 72 deforms on mounting.

The second lip 72 may provide the bearing unit with additional protection. The value of interference between the second lip 72 and the surface 31' will also depend on the axial play between the components of the bearing unit and on the positioning tolerances of the disk 55 with respect to the bearing unit 10. Therefore, the bearing unit according to various embodiments provides for a minimum interference of 0.1 mm in the worst combination of the tolerances. The presence of a further contacting lip slightly increases the friction torque of the bearing unit, although to a negligible degree with respect to the existing friction torque generated by the sealing device 50, and therefore has a negligible effect on the performance of the bearing unit.

The particular geometry of the screen 60 and of the elastomer coating 70 may result in the formation of two chambers. A first chamber 73 is radially compressed between the first lip 71 and the second lip 72 of the elastomer coating 70. More specifically, the first chamber 73 is delimited by a radially internal conical surface 71c of the first lip 71, by a radially external conical surface 72c of the second lip 72 (forming between them an angle $\alpha$ of the order of 105°) and by the surface 31' of the radially outer ring 31. The axial width a of the first chamber 73 is between 0.25 mm and 0.55 mm, greater than the meatus g of the channel 71' and therefore this first chamber 73 does not constitute a labyrinth seal but rather a volume for accumulation of lubricating grease.

A second chamber 74 may be formed between the disk 55 and the sealing device 50, radially internal with respect to the second lip 72. These two chambers act as a volume for accumulation of lubricating grease which creates a further barrier to the ingress of contaminants from the external environment. The presence of lubricating grease in both chambers is also useful as it lubricates the contact lips 71, 72. Due to the effect of the centrifugal forces, in the event of loss of grease, this grease may emerge in a radially external direction and escape the first chamber 73 of the external contaminant. Because the first lip 71 may have a small meatus (or in any case a small interference) with the surface 31' of the radially outer ring 31, with respect to the greater interference of the second lip 72 with the surface 31', it will be easier for contaminants and grease to get out of the first chamber 73 than the second chamber 74. Therefore, the function of retention of grease is important as the latter, with the aid of the geometry defined by the two lips 71, 72, may block the external contaminant in the first chamber 73, preventing it from getting as far as the second chamber 74, thus effectively protecting the sealing device 50 of the bearing unit 10.

The disk 55 is provided with a further feature of the bearing unit 10. As shown in FIG. 2, the radially outer ring 31 may have a spherical surface 31", radially external and in contact with the casing 41. Thus, the bearing unit 10 may rotate inside the spherical surface 41 of the casing 40. Typically, this rotation is of the order of ±2°. In FIG. 3 it can be seen that a third chamber 75 is created between the first lip 71 and the spherical surface 41. If rotation is clockwise, as shown in FIG. 3, this third chamber 75 is restricted and tends to become a further labyrinth with a radial meatus of the order of 0.3 mm.

With reference to FIG. 4, the thickness s of the screen 60 may have a value greater than the value of the thickness of known screens. In particular, compared to a standard value of 0.5 mm, the thickness s may have values in a range between 0.75 mm and 0.85 mm. This value may be equal to 0.8 mm with an increase of 60% with respect to the thickness of known screens.

The increase in thickness makes the screen 60 much more rigid and thus more resistant to the effect of the plant fibers that try to get in between the screen 60 and the seal 50. The greater thickness is also beneficial for anchoring with the radially inner ring.

The rigidity of the screen 60 may be further increased due to the presence of the oblique portion 65 which connects the two flange portions 63, 64.

The shape of the distal portion 62 of the screen 60, this distal portion having a limited length, may also increase the rigidity of the screen 60, as well as of the elastomer coating 70.

As stated above, agricultural applications provide for sealing devices 50 which use a greater number of sealing lips, for example five. Since such sealing devices may have a bigger axial space requirement, an axially external protection disk of known type would not be mountable on the radially inner ring as it would interfere with the locking collar 47 or with other systems for securing the radially inner ring to the shaft. For this reason, the screen 60 of the disk 55 may be configured to have an anchoring length l between the cylindrical surface 61' of the screen 60 and the homologous cylindrical surface 33' of the radially inner ring 33 that is smaller than the anchoring lengths used in known screens. In particular, compared to a standard value of 3 mm, the anchoring length l may assume values in a range between 2.3 mm and 2.5 mm. This value may be equal to 2.4 mm with a reduction of 20% with respect to the anchoring length of known screens.

The reduction in the anchoring length may be compensated for by, the screen 60 which may have a reinforced thickness and is thus more rigid than known screens. Anchoring may also be provided by a greater interference of 0.1 mm between the screen 60 and the radially inner ring 33. This is obtained by reducing by 0.2 mm the value of the diameter d of the cylindrical surface 61' of the screen 60. The value of the total diametral interference, with respect to the prior art, may be between 0.15 mm and 0.25 mm.

The geometry of the screen 60 in the area of anchoring to the radially inner ring 33 may form a further channel 76 between the second flange portion 64 of the screen and the sealing device 50. This channel 76 creates another labyrinth seal for protecting the bearing unit. The value of the axial width of the channel 76, in other words the value of the meatus h between the first lip 71 and the surface 31', in nominal conditions may be between 0.3 mm and 0.4 mm, while the design of the bearing unit may provide for a meatus h not smaller than 0.2 mm in the worst combination of tolerances involved.

By virtue of the abovementioned features, this innovative disk 55 coupled to the sealing device 50 may be suitable for the aims of the present disclosure. On the one hand it ensures greater protection for the sealing device, while on the other, due to its geometry, it makes it possible to increase the length of the labyrinth as a whole—in sequence, chamber 75, channel 71', chamber 73, chamber 74, channel 76—for the ingress of contaminants into the bearing unit compared to a standard solution without a disk 55 and may include only the sealing device 50.

Note that, in addition to the embodiments of the disclosure described above, many other variants exist. It may also be understood that these embodiments are simply examples and do not limit the subject matter of the disclosure or its applications or its possible configurations. On the contrary, although the description above makes it possible for a person skilled in the art to implement the present disclosure at least according to one exemplary configuration thereof, it may be understood that many variations of the components described may be envisaged without thereby exceeding the subject matter of the disclosure as defined in the attached claims, interpreted literally and/or according to their legal equivalents.

We claim:

1. A bearing unit comprising:
   a stationary radially outer ring;
   a radially inner ring, rotatable with respect to a rotation axis (X) and connected to a rotating shaft;
   a row of rolling bodies interposed between the radially outer ring and the radially inner ring;
   a casing housing the radially outer ring and the radially inner ring;
   a sealing device; and
   a protection disk, mounted in an axially external position to the sealing device and fixed to the radially inner ring, the protection disk comprising a shaped metallic screen, and an elastomer coating co-molded on part of the screen,
   wherein the protection disc is in contact with an axially external surface of the radially outer ring through the elastomer coating, wherein the elastomer coating is provided with a first lip and a second lip, wherein the first lip is radially external and is configured to be one of non-contacting and contacting with the axially external surface of the radially outer ring; and the second lip is radially internal and configured to contact the axially external surface of the radially outer ring,
   wherein the first lip forms a first channel with the axially external surface of the radially outer ring.

2. The bearing unit of claim 1, wherein the first channel comprises a meatus (g) not exceeding 0.2 mm.

3. The bearing unit of claim 1, wherein a minimum interference between the second lip and the axially external surface of the radially outer ring is 0.1 mm.

4. The bearing unit of claim 1, further comprising a first chamber and a second chamber configured to accumulate lubricating grease, the first chamber between the first lip and the second lip of the elastomer coating and the second chamber between the protection disc and the sealing device, radially internal with respect to the second lip.

5. A bearing unit comprising:
   a stationary radially outer ring;
   a radially inner ring, rotatable with respect to a rotation axis (X) and connected to a rotating shaft;

a row of rolling bodies interposed between the radially outer ring and the radially inner ring;

a casing housing the radially outer ring and the radially inner ring;

a sealing device; and a protection disk, mounted in an axially external position to the sealing device and fixed to the radially inner ring, the protection disk comprising a shaped metallic screen, and an elastomer coating co-molded on part of the screen, wherein the protection disc is in contact with an axially external surface of the radially outer ring through the elastomer coating, wherein the elastomer coating is provided with a first lip and a second lip, wherein the first lip is radially external and is configured to be one of non-contacting and contacting with the axially external surface of the radially outer ring; and the second lip is radially internal and configured to contact the axially external surface of the radially outer ring, wherein the protection disc is disposed in a radially internal position with respect to a radially internal spherical surface of the casing, and wherein a third chamber is disposed and between the first lip and the spherical surface.

6. The bearing unit of claim 5, wherein the third chamber comprises a radial width greater than 0.3 mm.

7. A bearing unit comprising:

a stationary radially outer ring;

a radially inner ring, rotatable with respect to a rotation axis (X) and connected to a rotating shaft;

a row of rolling bodies interposed between the radially outer ring and the radially inner ring;

a casing housing the radially outer ring and the radially inner ring;

a sealing device; and a protection disk, mounted in an axially external position to the sealing device and fixed to the radially inner ring, the protection disk comprising a shaped metallic screen, and an elastomer coating co-molded on part of the screen, wherein the protection disc is in contact with an axially external surface of the radially outer ring through the elastomer coating, wherein the elastomer coating is provided with a first lip and a second lip, wherein the first lip is radially external and is configured to be one of non-contacting and contacting with the axially external surface of the radially outer ring; and the second lip is radially internal and configured to contact the axially external surface of the radially outer ring, wherein the screen comprises:

a cylindrical portion configured to couple by interference with the radially inner ring, a distal portion oblique in a radially external and axially internal direction, wherein the elastomer coating is co-molded on the distal portion, a first flange portion connected to the distal portion, a second flange portion, connected to the cylindrical portion, and an oblique portion configured to connect the first flange portion and the second flange portion.

8. The bearing unit of claim 7, wherein the oblique portion and the distal portion are configured to stiffen the screen and the elastomer coating.

9. The bearing unit of claim 7, wherein a thickness (s) of the screen comprises a value in a range between 0.75 mm and 0.85 mm.

10. The bearing unit of claim 7, wherein the coupling by interference between the cylindrical portion of the screen and the radially inner ring is made between a cylindrical surface radially internal of the screen and a cylindrical surface radially external of the radially inner ring and an anchoring length between the cylindrical surface of the screen and the cylindrical surface of the radially inner ring is in a range between 2.3 mm and 2.5 mm.

11. The bearing unit of claim 10, wherein the diametrical interference between the cylindrical surface of the screen and the cylindrical surface of the radially inner ring comprises between 0.15 mm and 0.25 mm.

12. The bearing unit of claim 7, further comprising a second channel between the second flange portion of the screen and the sealing device, wherein the second channel comprises an axial width (h) not less than 0.2 mm.

* * * * *